United States Patent [19]

Suzuki

[11] Patent Number: 5,686,148
[45] Date of Patent: Nov. 11, 1997

[54] SYSTEM AND METHOD FOR CONVEYING ROTATABLE WORKS SUCH AS AUTOMOTIVE VEHICLE BODIES

[75] Inventor: Hidenori Suzuki, Hiroshima-ken, Japan

[73] Assignee: Mazda Motor Corporation, Hiroshima-ken, Japan

[21] Appl. No.: 278,127

[22] Filed: Jul. 21, 1994

Related U.S. Application Data

[63] Continuation of Ser. No. 854,850, Mar. 20, 1992, abandoned.

[30] Foreign Application Priority Data

Mar. 23, 1991 [JP] Japan ........................... 3-083337
Mar. 23, 1991 [JP] Japan ........................... 3-083338

[51] Int. Cl.$^6$ ........................... B05D 3/12; B05C 11/08
[52] U.S. Cl. ........................... 427/444; 427/346; 427/425; 118/320; 118/322; 198/377; 198/378; 198/375
[58] Field of Search ........................... 427/346, 425, 427/444; 118/320, 322; 198/377, 378, 375

[56] References Cited

U.S. PATENT DOCUMENTS

| | | | |
|---|---|---|---|
| 2,657,666 | 11/1953 | Fowler | 118/322 |
| 2,658,008 | 11/1953 | Williams et al. | 118/320 |
| 5,220,991 | 6/1993 | Yamaguchi et al. | 198/377 |
| 5,242,044 | 9/1993 | Yamaguchi et al. | 198/377 |

FOREIGN PATENT DOCUMENTS

0360301  3/1990  European Pat. Off. ........... 427/425

*Primary Examiner*—Katherine A. Bareford
*Attorney, Agent, or Firm*—Morrison & Foerster LLP

[57] ABSTRACT

A body of a vehicle, that is supported by a carrier or conveyor is rotated about a rotational axis extending in an approximately horizontal direction of the carrier or conveyor. When the body is supported in a normally standing position with its roof at the top of the body and its floor at the bottom thereof, the center of gravity of a rotary member containing the body is set to be at a position underneath the rotational axis in a vertically extending plane containing the rotational axis. The body is locked by a clamping unit so as to prevent rotation when the body is coated in the coating station. In the drying station, the locking by the clamping unit is released and the body is then displaced at a given angle so as to cause rotation on account of inertia on the basis of its own weight. After the drying station, the forcible rotation is shifted to free rotation which in turn is caused to be converged into a rest or normally standing position. The body is then aligned in its normally standing position and released from the carrier or conveyor. This arrangement can reduce force required for starting the rotation of the body and the force needed for suspending the rotation of the body.

20 Claims, 9 Drawing Sheets

SYSTEM AND METHOD FOR CONVEYING ROTATABLE WORKS SUCH AS AUTOMOTIVE VEHICLE BODIES

This application is a continuation of U.S. application Ser. No. 07/854,850, filed Mar. 20, 1992, now abandoned.

BACKGROUND OF THE INVENTION

1. Field of the Invention

The present invention relates to a system and a method for conveying works and, more particularly, to a system and a method for conveying works, such as bodies of vehicles, which are rotatably supported by carriers or conveyors running over a plurality of stations in a vehicle bodies assembly line.

2. Description of the Related Art

Generally, carriers or conveyors have widely been employed as means for conveying bodies of vehicles over stations, such as a coating station and a drying station, in a coating line of a vehicle body assembly plant.

U.S. Pat. Nos. 4,874,639, 4,919,977, 4,968,530, 4,988,537, 5,063,085 and 5,009,931 disclose coating methods for coating bodies of vehicles with a coating paint in a film thickness thicker than the film thickness of the coating paint that causes sagging in natural conditions. It is disclosed in those prior patents that the sagging of the coating paint coated on the body of the vehicle is controlled or suppressed by rotating the body thereof loaded on and supported by a carrier or conveyor about a rotational axis of the body extending in the substantially horizontal direction of the carrier or conveyor.

It is to be noted, however, that the technology disclosed in those prior patents may fail to suspend the body of the vehicle on the carrier or conveyor constantly in such a normally standing state or position that a roof of the body is positioned at the top of the body and a floor thereof is positioned at the bottom thereof, when the application of the rotational force to the body is suspended, because gravity of the body is adapted to be disposed in the position that coincides with the rotational axis of the body extending in a substantially horizontal direction of the carrier or conveyor. Hence, in order to allow the body of the vehicle in the normally standing position to be transferred to the following station, the carrier or conveyor is required to have means for detecting the normally standing position of the body during the rotation of the body of the vehicle, means for driving the rotation of the body to its normally standing position, means for aligning the body of the vehicle in its normally standing position and means for clamping the body of the vehicle in its normally standing position. The provision of these means makes the carrier or conveyor large in size and expensive to manufacture as well as renders the system of the carrier or conveyor complicated in operational system, thereby impairing efficiency in operation.

Further, as the rotation of a rotary member containing the body of the vehicle is rapidly suspended to sustain the body in its normally standing position at the moment when the normally standing position of the body thereof has been detected during the rotation of the rotary member, a large amount of load is exerted upon the means for driving the rotation of the body thereof, the means for aligning the body, and the like, thereby impairing reliability of those means.

On the other hand, as a large extent of force for driving the rotation of the body of the vehicle is required due to the heavy weight of the rotary member containing the body thereof at the moment of commencing the rotation of the body loaded on and supported by the carrier or conveyor, the prior technology as described hereinabove suffers from the disadvantage that the power source, such as an electric motor, for the means for driving the rotation of the body and parts for structuring the means for driving the rotation of the body are rendered large in size. In addition, since a large amount of impact load acts upon the structuring parts of the means for the driving the rotation of the body and other parts at the moment when the rotation of the body starts, reliability of those parts is impaired leading to a decrease in reliability of the unit for conveying the body of the vehicle.

SUMMARY OF THE INVENTION

The present invention has the object to solve the problems inherent in the aforesaid prior technology by reducing the force required for starting the rotation of works or for suspending the rotation thereof, given the method and a system for conveyance of the works while rotating the works loaded on and supported by a carrier or conveyor.

In order to achieve the object of an aspect of the present invention, the method for conveying works loaded on and supported by a running carrier or conveyor while rotating the works about a rotational axis extending in an approximately horizontal direction of the carrier or conveyor, which is characterized by:

a first step of forcibly rotating the works loaded on and supported by the carrier or conveyor about the rotational axis extending in the approximately horizontal direction thereof by applying rotational force to the works;

a second step of shifting forcible rotation of the works to free rotation of the works by suspending application of the rotational force to the works;

a third step of holding the works so that the free rotation of the works causes the works to rotate to a selected position and the rotation of the works is then suspended; and a fourth step of discharging the works from the carrier or conveyor;

wherein the center of gravity of a rotary member containing the works is set in a position that is eccentric from the rotational axis.

The arrangement for the method according to the present invention can offer the advantages that, when the forcible rotation of the works is shifted to the free rotation thereof at the second step of the method, the works is allowed to pivot about the gravity of the rotary member, including the works, that is located in the lowest position, because the center of gravity of the rotary member is set in the position that is eccentric from the rotational axis extending in the approximately horizontal direction of the carrier or conveyor on which the works is loaded. The free rotation of the works is then gradually converted in its normally standing position. Hence, the works can be held in its normally standing position with a small force at the third step of the method.

In another aspect, the present invention consists of a method for conveying works loaded on and supported by a running carrier or conveyor while rotating the works about a rotational axis extending in an approximately horizontal direction of the carrier or conveyor, which is characterized by:

a first step of forcibly rotating the work loaded on and supported by the carrier or conveyor at a predetermined angle about the rotational axis extending in the approximately horizontal direction thereof;

a second step of rotating the works on account of inertia about the rotational axis extending in the approximately horizontal direction of the carrier or conveyor by shifting forcible rotation of the works to free rotation thereof; and a third step of forcibly rotating the works about the rotational axis extending in the approximately horizontal direction thereof by applying rotational force to the works when the direction of rotation of the works on account of inertia coincides with the direction of the forcible rotation of the work in the course of the rotation of the works on account of inertia;

wherein the center of gravity of a rotary member containing the works is located in a position that is below a horizontal plane that contains the rotational axis, prior to rotation of the works.

This arrangement of the method according to the another aspect of the present invention allows the forcible rotation of the works to be continued after the rotation of the works on account of inertia at the second step of the method, thereby causing the forcible rotation of the works to be commenced with small driving force.

In a further aspect, the present invention consists of a system for conveying works loaded on and supported by a carrier or conveyor running over a plurality of stations while rotating the works about a rotational axis extending in an approximately horizontal direction of the carrier or conveyor, which is characterized by:

a locking or unlocking mechanism for locking or unlocking a rotational movement of a rotary member containing the works in such a state that the works is loaded on the carrier or conveyor with its roof positioned at the top of the works and its floor positioned at the bottom thereof and that the center of gravity of the rotary member containing the works is set so as to be positioned eccentrically from and underneath the rotation axis in a vertically extending plane containing the rotational axis; and means for releasing force of driving forcible rotation so as to allow free rotation of the rotary member by suspending application of rotational force to the rotary member;

wherein the center of gravity of the rotary member containing the works rotating about the rotational axis extending in the approximately horizontal direction of the carrier or conveyor is set so as to be eccentric from the rotational axis.

The system for conveying the works according to the present invention allows the works to pivot in a free fashion in a normally standing state or position in which the roof of the works is disposed at the top of the works and the floor thereof is disposed at the bottom thereof, when application of the rotational force to the works is suspended by the means for releasing the force of driving the forcible rotation of the works, after the works has been forcibly rotated by releasing the operation of the locking mechanism, because the center of gravity of the rotary member containing the works is set in the position that is eccentric from the rotational axis extending in the approximately horizontal direction of the carrier or conveyor. The pivotal movement then converges gradually into the normally standing position in which the works is supported by the carrier or conveyor with the roof of the works disposed at the top of the works and the floor thereof disposed at the bottom of the works. Hence, when the works is to be held at the third step of the method according to the present invention, the force required for holding the works is set small. Further, when the works is displaced at the predetermined angle from its normally standing position prior to the application of the rotational force to the works, the works starts rotating on account of inertia due to its own weight. In addition, when the rotational force is applied to the works when the direction of rotation of the works on account of inertia coincides with the direction of the forcible rotation thereof in the course of the rotation of the works on account of inertia, the forcible rotation of the works can be commenced with a small quantity of force for rotating the works.

Other objects, features and advantages of the present invention will become apparent in the course of the description of the preferred embodiments, which follows, with reference to the accompanying drawings.

DETAILED DESCRIPTION OF THE PREFERRED EMBODIMENTS

The present invention will be described more in detail by way of examples with reference to the accompanying drawings.

The following example is directed to an embodiment in which the present invention is applied to a method and a system for conveying bodies of vehicles by carriers or conveyors in an overcoating section of a vehicle body coating line of an automotive vehicle manufacturing plant. The body of the vehicle to be coated is loaded on and supported by the carrier or conveyor and rotates in a predetermined direction of rotation about a rotational axis extending nearly horizontally in a lengthwise direction of the body of the vehicle, and the carrier or conveyor is transferred on or along the vehicle body coating line.

A description will be made of the overcoating section UP of the vehicle bodies coating line, in which the body of the vehicle B is coated with an overcoating paint to form an overcoat thereon.

Figure 1:
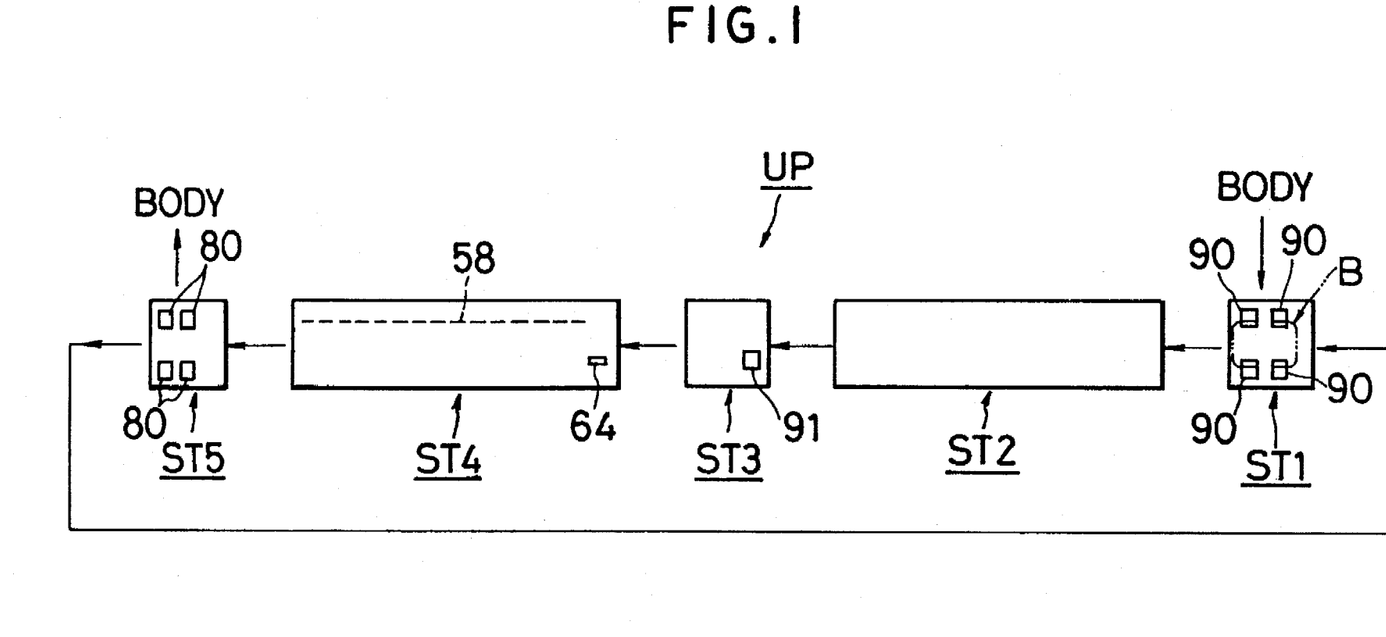
FIG. 1 is a block diagram showing an outline of working stations disposed in the overcoating sub-line of the coating line for coating bodies of vehicles.

As shown in FIG. 1, the overcoating section UP is composed of an entrance station ST1, an overcoating station ST2, an unlocking station ST3, a drying station ST4 and a discharging station ST5, these stations being disposed in this order from the upstream side to the downstream side of the overcoating section UP. A plurality of conveying systems HS for conveying bodies B of vehicles, including carriers or conveyors 10, are disposed on the overcoating section UP so as to move over the entire range from the entrance station ST1 to the discharging station ST5. The carrier or conveyor 10 is loaded with the body of the vehicle B and runs along the overcoating section UP from the entrance station ST1 through the overcoating station ST2, the unlocking station ST3 and the drying station ST4 to the discharging station ST5.

In the entrance station ST1 are disposed four of body-fixing units 90 for fixing the body B of the vehicle. After the body B of the vehicle has been coated with an intermediate coating paint in an intermediate coating station although not shown in the drawing, the body B of the vehicle is transferred to the entrance station ST1 by the aid of a hanger conveyor (not shown) and loaded on the carrier or conveyor 10 located in the entrance station ST1. The body B of the vehicle is fixed to the carrier or conveyor 10 through four of the body-fixing units 90 and locked with the body-fixing units 90 in such an normally standing position as shown in FIG. 2, i.e. that the roof of the body B is disposed at the top of the body and the floor thereof is disposed at the bottom thereof.

Then, the body B of the vehicle loaded on and supported by the carrier or conveyor 10 is transferred to the overcoating station ST2 where the body B of the vehicle is coated with an overcoating paint so as to form an overcoat having a predetermined film thickness of, for example, nearly 60 microns, while the body B is transferred toward the downstream side of the overcoating line.

Figure 2:
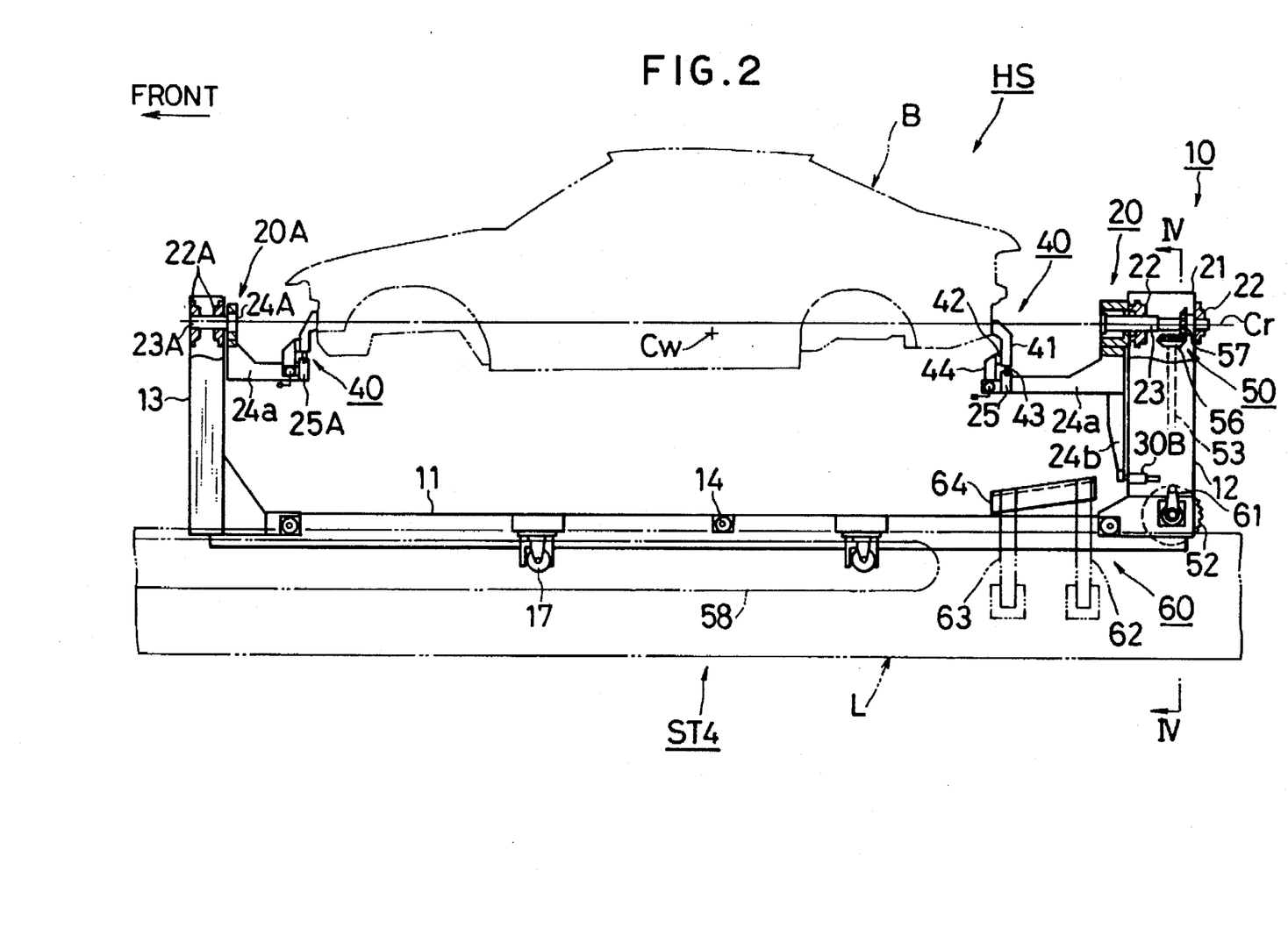
FIG. 2 is a partially cutaway side view showing a carrier or conveyor for conveying a body of a vehicle while rotating the body thereof.

The unlocking station ST3 is disposed following the overcoating station ST2, thereby unlocking the body B of the vehicle from the carrier or conveyor 10 by the aid of an unlocking unit 91 disposed in the unlocking station ST3 and allowing the body B of the vehicle to rotate about a rotational axis Cr extending nearly horizontally in the lengthwise direction of the body B of the vehicle, as shown in FIG. 2. The body B of the vehicle is then transferred to the drying station ST4.

The drying station ST4 is provided with a guide member 64 constituting a pivotal mechanism 60 at its upstream portion and with an endless chain 58 constituting a driving mechanism 50 for driving a rotational movement on its downstream side of the guide member 64. In the drying station ST4, the body B of the vehicle is rotated in the clockwise direction (when viewed from the rear of the body of the vehicle) at a predetermined angle with the aid of the guide member 64 of the pivotal mechanism 60. Thereafter, the body B of the vehicle is caused to engage with the driving mechanism 50 in the course of a counterclockwise rotation on account of inertia after released from the guide member 64, and the body B of the vehicle is allowed to rotate continuously in the counterclockwise direction by the aid of the driving mechanism 50. In other words, the body B of the vehicle loaded on and supported by the carrier or conveyor 10 is moved toward the downstream side along the drying station ST4 while the body B of the vehicle is being rotated continuously in the counterclockwise direction. During the conveyance through the drying station ST4 and the continuous rotation of the body B of the vehicle, the coat formed on the surface of the body B of the vehicle is dried and baked. The body B of the vehicle is then released from the driving mechanism 50 so as to allow a free rotation and transferred to the discharging station ST5.

In the discharging station ST5 are disposed four of releasing units 80 for releasing the body B of the vehicle. The body B of the vehicle is aligned in an normally standing position and then released from the carrier or conveyor 10 by the aid of the releasing units 80.

The body B of the vehicle released from the carrier or conveyor 10 in the discharging station ST5 is then conveyed via a hanger conveyor (not shown) to a station which follows. On the other hand, the empty carrier or conveyor 10 from which the body B of the vehicle has been unloaded is returned to the entrance station ST1.

As described hereinabove, the conveying system HS is composed roughly of the carrier or conveyor 10, the driving mechanism 50, the pivotal mechanism 60 and the releasing unit 80. A description will now be made of each of the elements structuring the conveying system HS.

Figure 3:
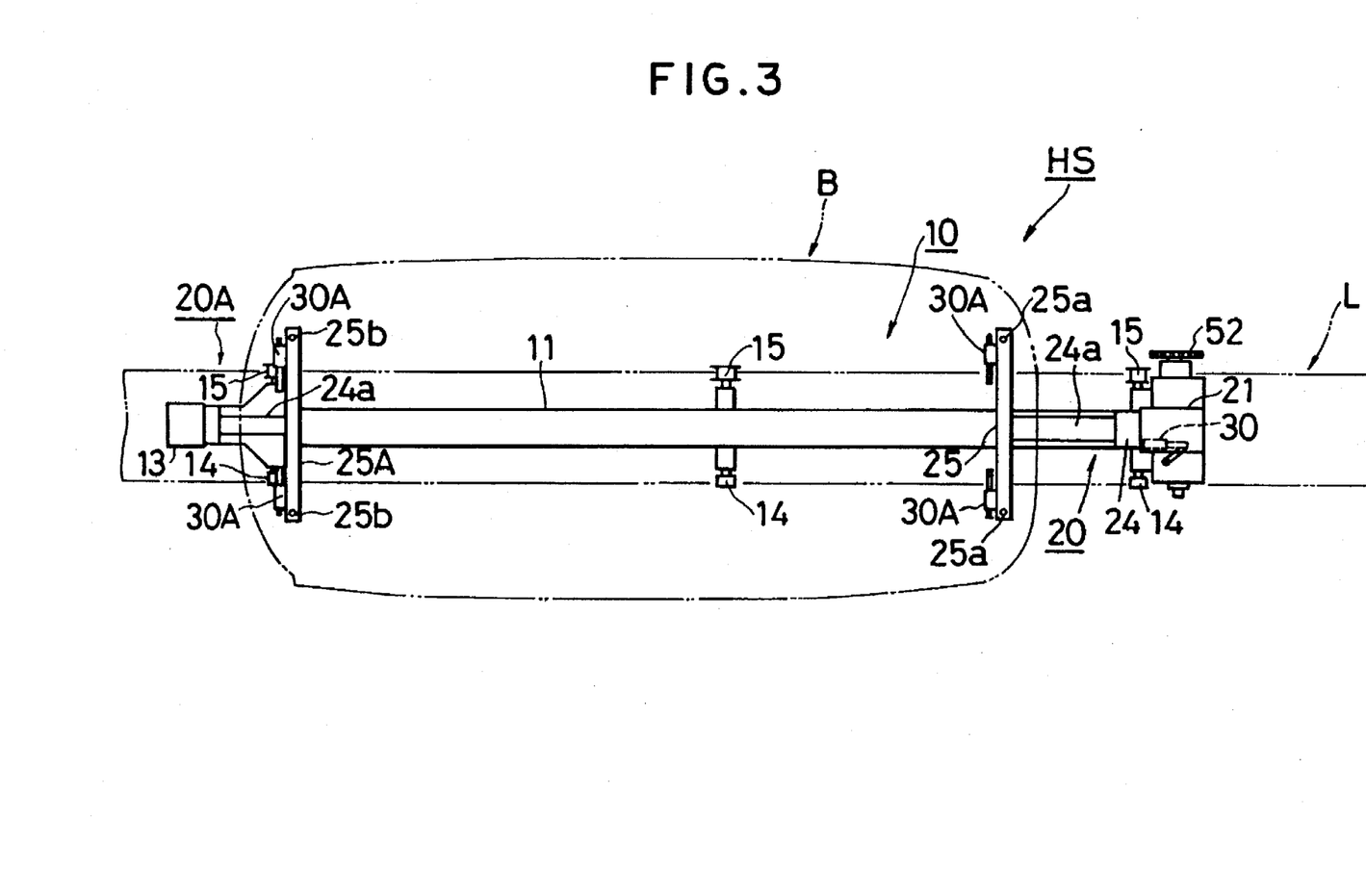
FIG. 3 is a plan view showing the carrier or conveyor of FIG. 2.
Figure 4:
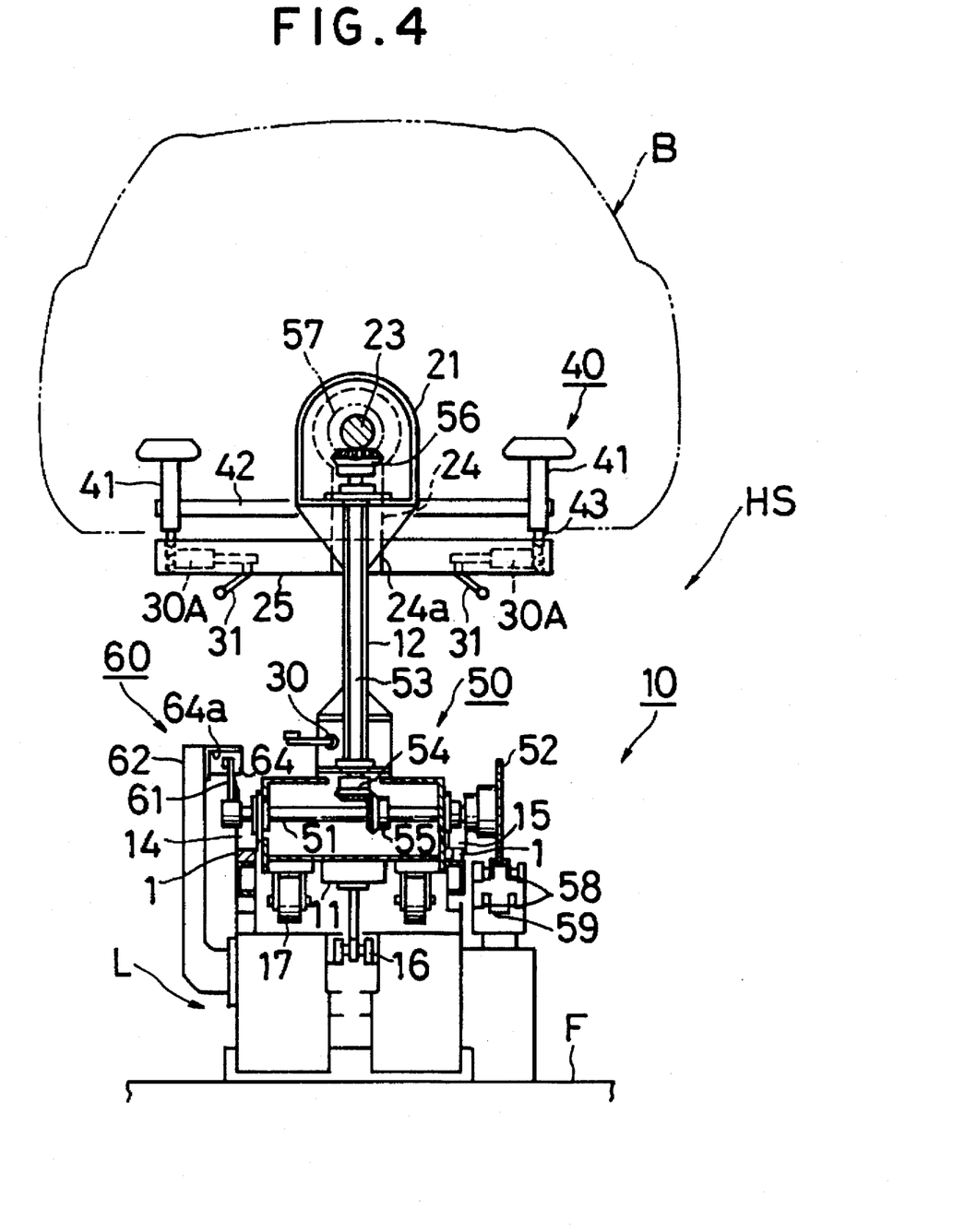
FIG. 4 is a sectional view when taken along line IV—IV of FIG. 2.

As shown in FIGS. 2 to 4, a plurality of the carriers or conveyors 10 are disposed on a conveyor line L disposed on a floor F of the overcoating section UP and extending over the entire range from the entrance station ST1 through the stations ST2, ST3 and ST4 to the discharging station ST5.

The carrier or conveyor 10 comprises a base section 11 extending in its lengthwise direction, a rear standing column section 12 disposed at a rear end of the base section 11, a front standing column section disposed at a front end thereof, a rear rotation supporting section 20 mounted to the rear standing column section 12, and a front rotation supporting section 20A mounted to the front standing column section 13. The body B of the vehicle is supported with and fixed to both of the rear and front rotation supporting sections 20 and 20A so as to be rotatable about the rotational axis Cr. The carrier or conveyor 10 is disposed so as to be movable on or along a rail 1 disposed on the conveyor line L by the aid of supporting wheels 14 and 15 disposed in the base section 11, and the supporting wheels 14 and 15 are disposed so as to be drivable by a chain-type driving mechanism (not shown).

In the accompanying drawings, reference numeral 16 denotes an auxiliary wheel disposed in the base section 11, and reference numeral 17 denotes a supporting wheel which is rotatably driven on the rail 1 while the carrier or conveyor 10 is returned from the discharging station ST5 to the entrance station ST1.

A description will now be made of the rear rotation supporting section 20 disposed on the rear standing column section 12 of the carrier or conveyor 10 and the front rotation supporting section 20A disposed on the front standing column section 13 thereof. It is to be noted herein, however, that since the front and rear rotation supporting sections 20 and 20A have substantially the same structures, a description is made mainly of the rear rotation supporting section 20 as an example and a description of the front rotation supporting section 20A is directed only to the elements that differ from the rear rotation supporting section 20. It is further to be noted that the same or identical elements are provided with the same reference symbols and a duplicate description of the same or identical elements will be omitted from the following description for brevity of explanation.

Referring to FIGS. 2 to 4, a gear box 21 is mounted to a top portion of the rear standing column section 12 and has bearings 22 at its front and rear portions mounted so as to support a shaft member 23 extending nearly horizontally in the lengthwise direction of the carrier or conveyor 10. To a front end portion of the shaft member 23, which projects outwardly from an inner side of the gear box 21 in the forward direction of the carrier or conveyor 10, i.e. toward the inside thereof, is mounted a rotary member 24 which in turn comprises an arm section 24a located below the rotational axis Cr and extending forwards and an extension section 24b extending downward from the arm section 24a.

As shown in FIGS. 3 and 4, a supporting member 25 extending in the transverse direction of the carrier or conveyor 10 is mounted and secured to a front end of the arm section 24a. At the left and right sides of the supporting member 25 are formed round engagement apertures 25a, as shown specifically in FIG. 3. To the front end surface at the left and right sides of the supporting member 25 are mounted clamping units 30A of a toggle type so as to be directed in the transverse direction of the carrier or conveyor 10, as shown specifically in FIGS. 3 and 4.

Figure 5:
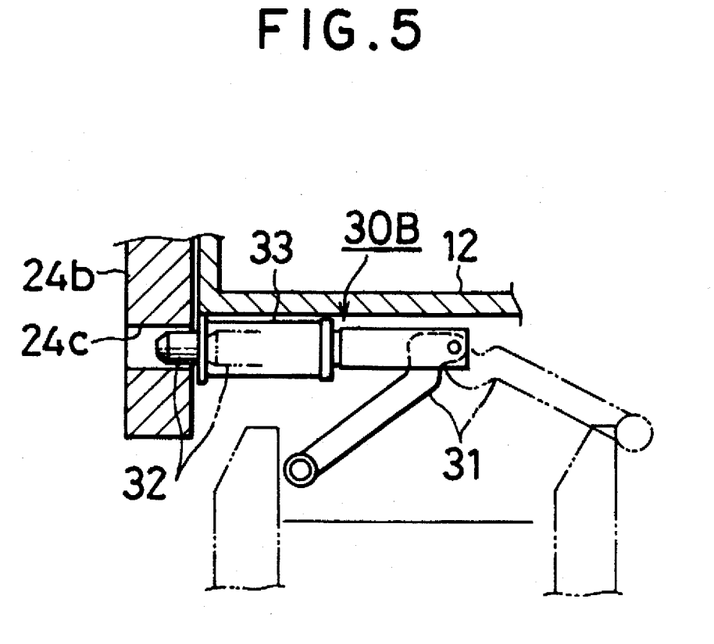
FIG. 5 is a sectional view With an essential portion extended, showing a clamping unit for inhibiting the rotational movement of the body of the vehicle supported by the carrier or conveyor.

As shown in FIGS. 2 and 5, the rotary member 24 is provided with an engaging aperture 24c at the lower end portion of the extension section 24b and the engaging aperture 24c is disposed so as to extend in the transverse direction of the carrier or conveyor 10. On the other hand, a clamping unit 30B of a toggle type is mounted to the standing column section 12 encountering the engaging aperture 24c so as to enter into and engage with the engaging aperture 24c, when the rotation supporting section 20 is disposed in its normally standing position, i.e. when the extension section 24b of the rotary member 24 is located in its lowest position, thereby allowing the clamping unit 30B to lock the rotation of the rotation supporting section 20, thereby suppressing the body B of the vehicle from rotating.

On the other hand, the rotary member 24A of the front rotation supporting section 20A has an arm section 24a mounted in the position underneath the rotational axis Cr, and the arm section 24a extends and projects rearward. It is noted herein that, unlike the extension section 24b disposed to the rear rotation supporting section 20, no extension section is provided. To the arm section 24a of the rotary member 24A is mounted a supporting member 25A fixed to a rear end of the arm section 24a and projecting transversely in a predetermined length. An upper surface of the supporting member 25A is provided at its left and right sides each with an engaging aperture 25b extending in the lengthwise direction of the carrier or conveyor 10. A clamping unit 30 is transversely mounted at each of the left and right sides of a front end portion of the supporting member 25A so as to correspond to the left and right engaging apertures 25b. It is noted herein that the axis of the shaft members 23 and 23A are disposed so as to coincide with the rotational axis Cr. Bearings 22A are also provided around shaft member 23A.

As shown in FIG. 2, when the body B of the vehicle is supported in the normally standing position by the rotation supporting sections 20 and 20A, the center of gravity Cw of the body B of the vehicle and the rotation supporting sections 20 and 20A is set to be eccentric from the rotational axis Cr in the vertically downward extending direction.

A description will now be made of a holding frame 40 mounted to each of a front end portion and a rear end portion of the body B of the vehicle. As the rear holding frame 40 has the same structure as the front holding frame 40, only the holding frame 40 mounted to the rear end portion of the body B of the vehicle will be described hereinafter for brevity of explanation.

As shown in FIGS. 2 and 4, the holding frame 40 comprises a pair of left-hand and right-hand fixing members 41, each extending downward from the rear end portion of the body B of the vehicle, a connecting member 42 fixed to the left-hand and right-hand fixing members 41 and extending in the transverse direction of the body B of the vehicle, an engaging pin 43 secured to each of bottom ends of the left-hand and right-hand fixing members 41, and an engaging member 44 secured to each of left-hand and right-hand ends of a rear end of the connecting member 42. The connecting member 42 is nearly as long as the supporting member 25. The engaging member 44 is provided at its bottom end with an engaging aperture 44a. The distance between the left-hand and right-hand engaging pins 43 is set to be substantially equal to the distance between the left-hand and right-hand engaging apertures 25a.

The rotation driving mechanism 50 will now be described. As shown in FIGS. 2 and 4, the base section 11 of the carrier or conveyor 10 has a first shaft member 51 mounted to a rear end portion of the base section 11 so as to be rotatable. The first shaft member 51 extends transversely and has a sprocket 52 mounted to its right end portion. Further, a bevel gear 55 is mounted to the first shaft member 51 in its intermediate position.

On the other hand, a second shaft member 53 extending vertically is disposed in the standing column section 12 of the carrier or conveyor 10 so as to be rotatable. To a bottom end of the second shaft member 53 is mounted a bevel gear 54 so as to be engaged with the bevel gear 55 mounted to the first shaft member 51. Further, a top end of the second shaft member 53 has a bevel gear 56 mounted so as to engage with a bevel gear 57 mounted to the shaft member 23.

Referring again to FIGS. 2 and 4, an endless chain 58 is disposed so as to extend along the transferring line L over the range of the drying station ST4 except for the upstream end portion. The endless chain 58 is rotated in the direction opposite to the direction of conveyance of the body B of the vehicle with the aid of a driving unit (not shown). In FIG. 4, reference numeral 59 denotes a guide wheel mounted to the endless chain 58.

In the entrance station ST1, the body B of the vehicle is transferred in its normally standing position from the previous station and loaded on the carrier or conveyor 10 suspended in a predetermined position. When the carrier or conveyor 10 is suspended in the predetermined position in the entrance station ST1, the front and rear rotation supporting sections 20 and 20A are disposed in the normally standing positions so as to set the body B of the vehicle in its normally standing position and to support it in its state. The body B of the vehicle loaded on the carrier or conveyor 10 is aligned with the carrier or conveyor 10 by engaging the engaging pins 43 mounted to the body B of the vehicle with the engaging apertures 25a or 25b.

Thereafter, an operating lever 31 of the clamping unit 30B mounted to the standing column section 12 as well as operating levers 31 of the clamping units 30A mounted to the front and rear rotation supporting sections 20 and 20A are allowed to pivot with the aid of the fixing unit 90 for fixing the body B of the vehicle. More specifically, as shown in FIG. 5, the clamping unit 30B mounted to the standing column section 12 is shifted from its unlocked position by a cam plate (sliding member 94), as indicated by the two-dots-and-dash line, in which the engaging pin 32 is positioned within a sleeve 33, to a locked position, as indicated by the solid line, in which the engaging pin 32 projects from the sleeve 33 and is positioned outside the sleeve 33. The rotation supporting section 20 is locked in its normally standing position by allowing the engaging pin 32 to enter into the engaging aperture 24c of the extension section 24b. Likewise, the clamping unit 30A mounted to each of the front and rear rotation supporting sections 20 and 20A is shifted from its unlocked position to its locked position. By setting each of the engaging pins 32 to its locked position, the body B of the vehicle is supported by the carrier or conveyor 10 without detachment therefrom even when the rotation supporting sections 20 and 20A rotate the body B of the vehicle loaded on the carrier or conveyor 10.

After the body B of the vehicle is fixed to the carrier or conveyor 10 in the manner as described hereinabove, the carrier or conveyor 10 is transferred downward to the overcoating station ST2 where the body B of the vehicle loaded in its normally standing position is coated with an overcoating paint. After the completion of the overcoating step carried out in the overcoating station ST2, the carrier or conveyor 10 is transferred to the unlocking station ST3 where the clamping unit 30B mounted to the standing column section 12 is shifted from its locked position to its unlocked position with the aid of the unlocking unit 91, thereby allowing the body B of the vehicle to be rotatable about the rotational axis Cr.

A description will then be made of the pivotal mechanism 60 with reference to FIGS. 2 and 4. As shown in FIGS. 2 and 4, the pivotal mechanism 60 has a lever member 61 mounted to a left-hand end portion of the shaft member 51 disposed at the rear end portion of the base section 11 of the carrier or conveyor 10. The lever member 61 is so arranged as to extend upward in the vertical direction, as shown in the drawings, when the rotation supporting section 20 assumes its normally standing position.

The pivotal mechanism 60 is disposed at the left side of an upstream section of the drying station ST4 and comprises front and rear supporting members 62 and 63 disposed on the left side in FIG. 4 and extending vertically as well as a sectionally L-shaped guide member 64 having a predetermined length.

As shown specifically in FIG. 2, the guide member 64 is fixed to the top inner surfaces of the supporting members 62 and 63 so as to incline towards the front portion of the carrier or conveyor 10 with its front portion located in the lower position and with its rear portion located in the upper position. As shown specifically in FIG. 4, an upper wall portion 64a of the guide member 64 is disposed so as to be abuttable with the lever member 61 mounted to the left end portion of the shaft member 51 disposed at the rear end portion of the base section 11 of the carrier or conveyor 10. It is to be noted herein that a front end of the guide member 64 of the pivotal mechanism 60 is disposed apart in a predetermined distance from a rear end of the endless chain 58.

Figure 6:
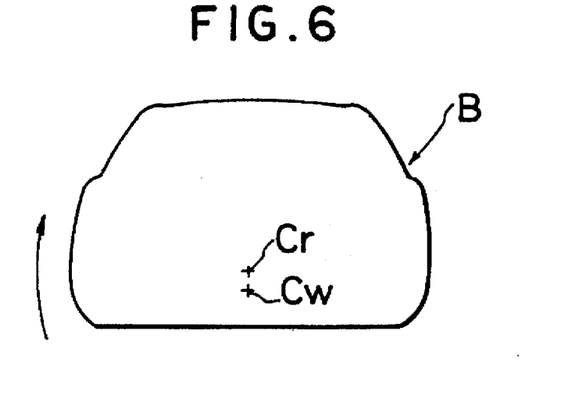
FIG. 6 is a schematic representation showing the direction of a pivotal movement of the body of the vehicle when the body thereof is displaced at a predetermined angle from its normally standing position.

As the carrier or conveyor 10 with the body B of the vehicle loaded thereon is transferred to the upstream section of the drying station ST4 after the body B of the vehicle has been unlocked by the unlocking unit 91 in the unlocking station ST3 and released so as to be rotatable about the rotational axis Cr, the lever member 61 is allowed to abut with the upper wall portion 64a of the guide member 64. As the carrier or conveyor 10 runs in the drying station ST4, the lever member 61 is forced by the guide member 64 to rotate in the clockwise direction, thereby rotating the shaft member 51. The force of rotation of the shaft member 51 is transmitted eventually to the shaft member 23 via the bevel gears 54 and 55, the shaft member 53 as well as the bevel gears 56 and 57, whereby the body B of the vehicle is rotated in the clockwise direction, as indicated by the arrow in FIG. 6, at a predetermined angle, e.g. 45°.

Figure 7:
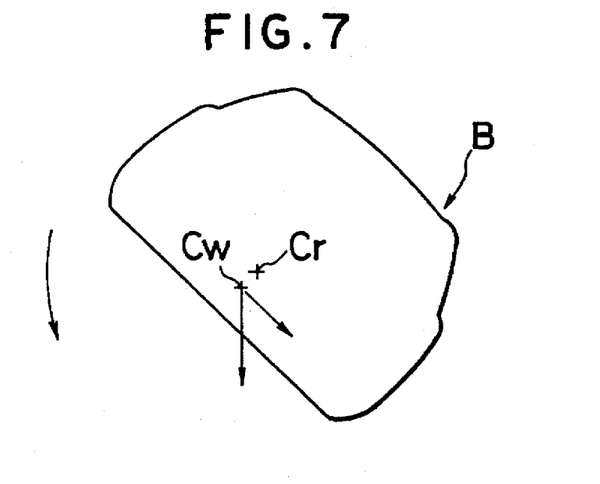
FIG. 7 is a schematic representation showing the direction of rotation on account of inertia due to its own weight when the body of the vehicle loaded on and supported by the carrier or conveyor is displaced at the predetermined angle and then when the body thereof is allowed to rotate in a free fashion.
Figure 8:
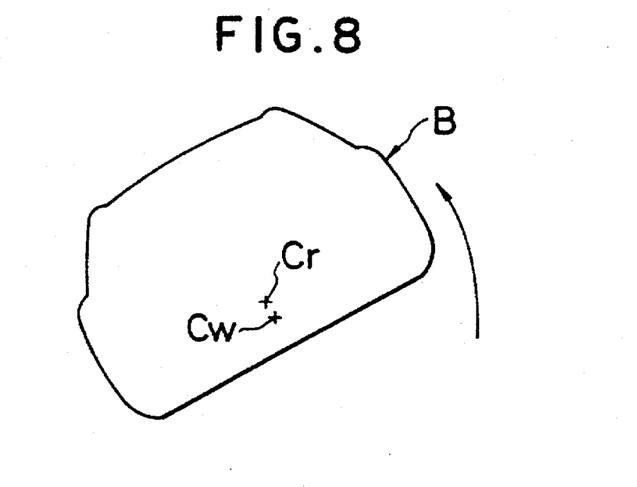
FIG. 8 is a schematic representation showing the state in which the rotation of the body of the vehicle on account of inertia is shifted to the forcible rotation of the body.

Thereafter, as the lever member 61 passes through the guide member 64 and is released therefrom, the body B of the vehicle is rotated on account of inertia due to its own weight in the counterclockwise direction as indicated by the arrow in FIG. 7, while the body B of the vehicle loaded on the carrier or conveyor 10 is being transferred toward the downstream side of the drying station ST4. In the course in which the body B of the vehicle is counterclockwise rotating on account of inertia as shown in FIG. 8, the sprocket 52 is caused to engage with the endless chain 58 and the rotational force of the endless chain 58 is transmitted to the shaft member 51 through the sprocket 52. The rotation of the shaft member 51 is further transmitted to the shaft member 23 to thereby rotate the rotation supporting sections 20 and 20A and to rotate the body B of the vehicle continuously in the counterclockwise direction.

By starting the rotation of the rotation supporting sections 20 and 20A due to the start of the driving mechanism 50 for driving the rotation of the body B of the vehicle in the course in which the body B of the vehicle is counterclockwise rotating on account of inertia due to its own weight, the rotation of the body B of the vehicle can be started with an extremely small degree of starting force, thereby making the driving mechanism 50 compact.

Further, as the force of driving the rotation of the body B of the vehicle is applied during the course of the rotation of the body B of the vehicle on account of inertia, the driving of the rotation of the body of the vehicle B can be started in a smooth way. Hence, no large impact load acts upon parts or units for structuring the driving mechanism 50 and the rotation supporting sections 20 and 20A so that durability of those parts and units can be enhanced. Further, durability of the conveying system HS can also be enhanced.

Figure 9:
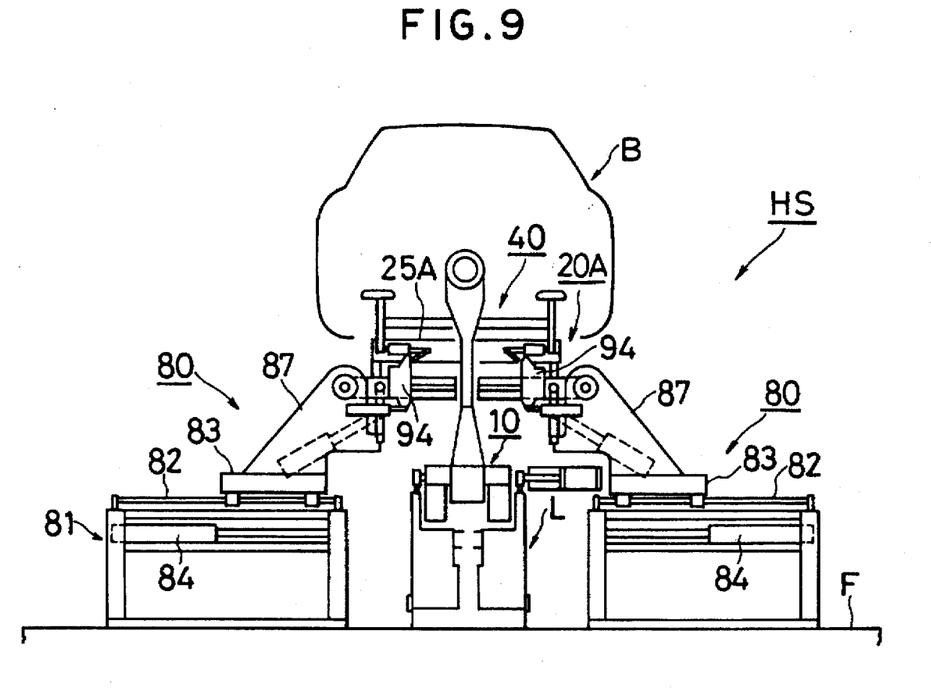
FIG. 9 is a front view showing a unit for releasing the fixing of the body of the vehicle, disposed in the discharging station for discharging the body of the vehicle from the carrier or conveyor while suppressing the pivotal movement of the body supported by the carrier or conveyor.

Then, a description will be made of the releasing unit 80 for releasing the fixing of the body B of the vehicle. As shown in FIG. 9, four of the releasing units 80 mounted on or in the discharging station ST5 are disposed in such a way that the two releasing units 80 are positioned on the left side of the carrier or conveyor 10 suspended in the predetermined position of the discharging station ST5 of the transferring line L so as to face or correspond to the front side of the body B of the vehicle loaded on the carrier or conveyor 10 while the other two releasing units 80 are positioned on the right side thereof so as to face or correspond to the rear side of the body B of the vehicle loaded thereon. It is to be noted herein that, as all the four releasing units 80 have the same structures, a description will be made of the releasing unit 80 disposed at the right side of the transferring line L, which is positioned on the right side of the carrier or conveyor 10 so as to correspond to the right front side of the body B of the vehicle.

Figure 10:
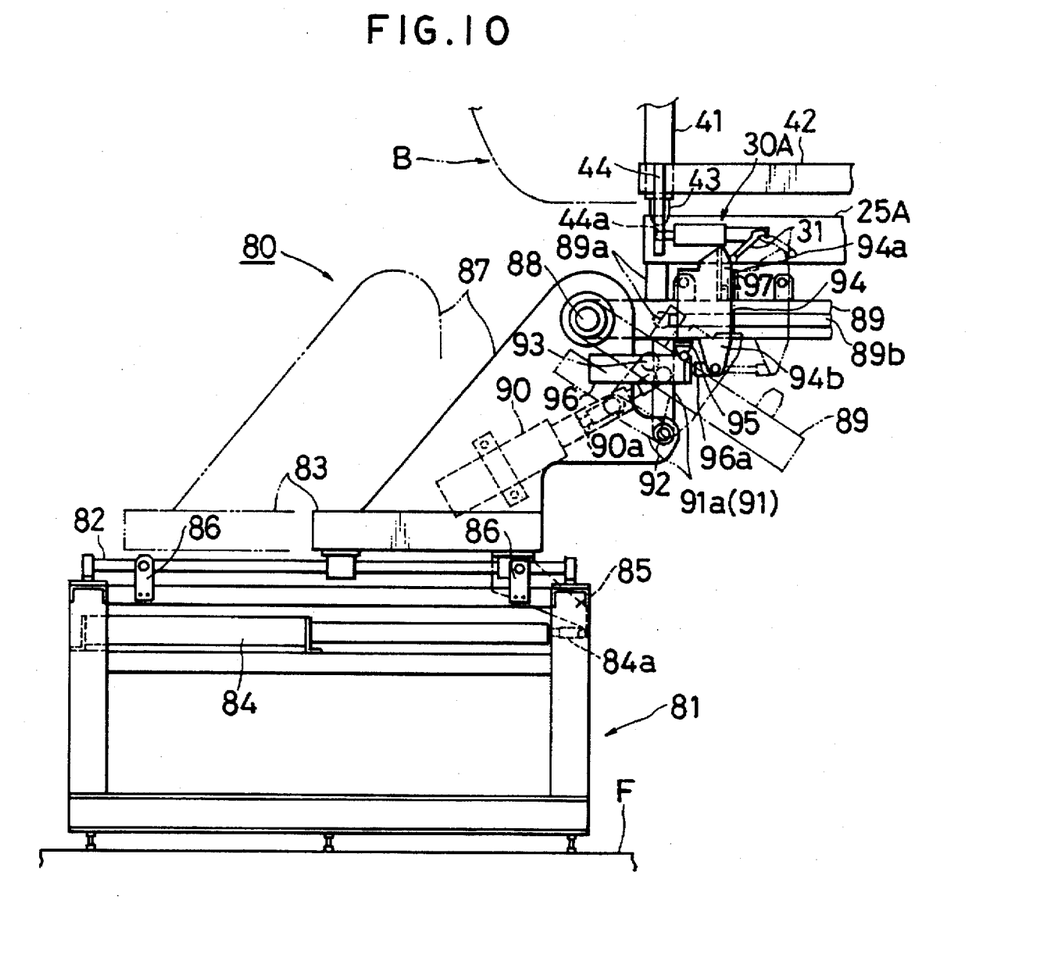
FIG. 10 is an extended front view of the releasing unit of FIG. 10.
Figure 11:
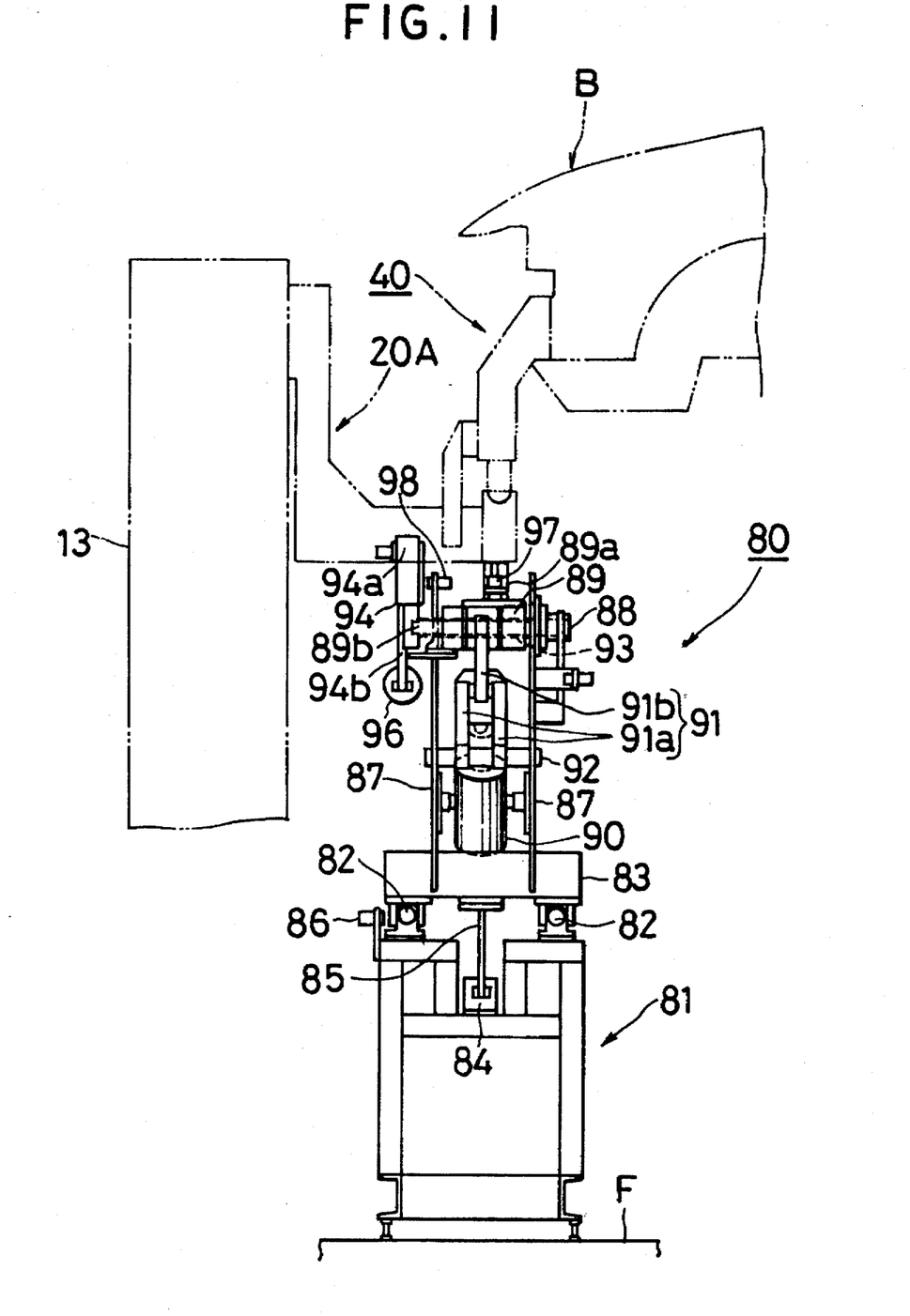
FIG. 11 is a side view of the releasing unit of FIG. 9.

As shown in FIGS. 9 to 11, the releasing unit 80 comprises a base frame 81 disposed on the floor F, a pair of front and rear guide members 82 mounted on an upper portion of the base frame 81 and extending in the transverse direction of the base frame 81, and a movable table 83 mounted so as to be movable transversely along and by guidance of the guide members 82. The base frame 81 has an air cylinder 84 disposed so as to extend over the entire transverse length between the side walls of the base frame 81, and an end of a rod 84a of the air cylinder 84 is provided with a bracket 85 which in turn is connected to a bottom end of the movable table 83. This arrangement allows the movable table 83 to move between an evacuating position, as indicated by two-dots-and-dash line in FIG. 10, in which the movable table 83 is returned by suspending the air cylinder 84 and located at the outer side of the guide member 82, and a holding position, as indicated by solid line in FIG. 10, in which the movable table 83 is moved by driving the air cylinder 84 and located at the inner side thereof. It is noted herein that reference numeral 86 denotes an non-contact switch for detecting the position of the movable table 83.

The movable table 83 has a pair of front and rear standing support members 87. A fitting member 89 is mounted on an upper portion of the standing support member 87 so as to be pivotable and an air cylinder 90 is mounted on a lower portion thereof so as to allow a rod 90a of the air cylinder 90 to extend inwardly and obliquely upward. To the rod 90a is mounted a bottom end portion of a link 91 so as to be pivotable.

The link 91 comprises two lower link plates 91a located at its lower side and one upper link plate 91b located at its upper side. The lower link plates 91a are mounted to the front and rear standing support members 87 through a support shaft 92 so as to be pivotable. On the other hand, the lower link plate 91b is mounted rotatably to a lengthwise intermediate portion of the fitting member 89 through a support shaft 93. As shown in FIG. 10, this arrangement allows the fitting member 89 to assume its operating position, as indicated by the solid line, in which the fitting member 89 pivots upward, and its non-operating position, as indicated by the two-dots-and-dash line, in which the fitting member 89 pivots downward.

The member 89 has an abutting section 89a on the side of the support shaft 88 disposed on the left side of the member 89, and the abutting section 89a extends upward. At a middle portion of the member 89 is mounted a standing damper 97. The member 89 is provided at its right end (free end) with a guide portion 89b extending in the transverse direction of the member 89 and a sliding member 94 is disposed to the guide portion 89b so as to be movable transversely along the member 89. The sliding member 94 is provided at its upper end with an operating section 94a and at its lower end with a connecting section 94b.

At the front side of the member 89 is mounted an air cylinder 96 through a bracket 95, and the air cylinder 96 is disposed so as to extend in the transverse direction of the base frame 81. A rod 96a of the air cylinder 96 is connected to the connecting section 94b of the sliding member 94. As shown in FIG. 10, the sliding member 94 is transferred so as to assume its evacuating position, as indicated by the solid line, in which the sliding member 94 is moved on the side of the support shaft 88, and its holding position, as indicated by the two-dots-and-dash line, in which the sliding member 94 slid along the guide section 89b of the member 89 toward the transferring line L. In the drawing, reference numeral 98 denotes an non-contact switch for detecting the position of the sliding member 94.

A description will now be made of the process of conveying the bodies B of the vehicles by the conveying system HS.

The body B of the vehicle is transferred from the entrance station ST1 to the unlocking station ST3 while the carrier or conveyor 10 on which the body B of the vehicle is loaded in the normally standing position is conveyed along or on the transferring line L of the vehicle bodies assembly line.

Then, in the drying station ST4, the body B of the vehicle is rotated about the rotational axis Cr extending in the lengthwise direction of the body, thereby drying and baking the overcoat formed on the surface of the body B of the vehicle. As the carrier or conveyor 10 is transferred up to the downstream end of the drying station ST4, the sprocket 52 is disengaged from the endless chain 58 to thereby allow the free rotation of the body B of the vehicle. Since the center of gravity Cw is eccentric from the rotational axis Cr, the pivotal movement of the body B of the vehicle, which is caused to be implemented while being loaded on the carrier or conveyor 10, is converged into its nearly normally standing position during a period of time when the carrier or conveyor 10 is caused to be suspended in the predetermined position of the discharging station ST5. As the carrier or conveyor 10 is suspended in the predetermined position, the body B of the vehicle loaded thereon is brought into a state in which the body B of the vehicle pivots slightly about the normally standing position in which the body B of the vehicle is supported on the carrier or conveyor 10 with its roof positioned at the top of the body and its floor positioned at the bottom thereof.

As the carrier or conveyor 10 is suspended in the predetermined position, the movable table 83 of each of the releasing units 80 for releasing the body B of the vehicle from the carrier or conveyor 10 is transferred from its evacuating position to its holding position, while the fitting member 89 is shifted from its non-operating position to its operating position. This arrangement allows each of the standing dampers 97 to abut with the bottom ends of the supporting members 25 and 25A of the rotation supporting sections 20 and 20A, respectively, thereby causing the dampers 97 to suppress the rotation supporting sections 20 and 20A from pivoting and thereby aligning the body B of the vehicle in its normally standing position. The abutment of the abutting section 89a of the member 89 with the bottom ends of the supporting members 25 and 25A causes the member 89 to be fixed to the carrier or conveyor 10 in such a state that the rotation supporting sections 20 and 20A as well as the body B of the vehicle are located in their normally standing positions.

Thereafter, the sliding member 94 is shifted from its evacuating position to its holding position, thereby allowing the operating levers of the clamping units 30 mounted to the supporting members 25 and 25A to pivot with the aid of the operating section 94a and shifting the engaging pins 32 of the clamping units 30 from their locking positions to their unlocking positions, followed by conveyance to a station where the bodies B of the vehicles are transferred to hanger conveyors (not shown) from the carriers or conveyors 10.

It is to be noted herein that the pivotal movement of the body B of the vehicle can be converged automatically into its approximately normally standing position because the gravity Cw is so arranged as to be located in the position that is eccentric from the rotational axis Cr in the vertical direction. This arrangement can omit a mechanism for returning the body of the vehicle to its normally standing position when rotated and a mechanism for detecting the normally standing position of the body B of the vehicle during rotation, thereby reducing a large amount of the cost for manufacturing the conveying system HS and improving the operational efficiency.

Further, it is to be noted that the alignment of the body B of the vehicle in its normally standing position can be implemented without exerting a large degree of load upon the releasing units 80 as well as the rotation supporting sections 20 and 20A because the body B of the vehicle is aligned after the pivotal movement of the body B of the vehicle converges to a substantially great extent and the body B of the vehicle is brought into its nearly normally standing position. This makes the releasing units 80 and the rotation supporting sections 20 and 20A compact and small in size yet high in durability.

In addition, it is to be noted that the carrier or conveyor 10 may be equipped with an electrically driving motor and it can be made self-movable. Furthermore, it is to be noted that the extension section 24b may be mounted to the rotary member 24A of the rotation supporting section 20A and the clamping units 30 may be mounted to the standing column section 13 so as to correspond to the extension section 24b, thereby allowing the clamping units 30 to lock the rotation of the rotation supporting sections 20 and 20A when the body B of the vehicle is transferred to the carrier or conveyor 10 in the entrance station ST1.

What is claimed is:

1. A method for conveying works loaded on and supported by a running carrier or conveyor while rotating said works about a rotational axis extending in an approximately horizontal direction of the carrier or conveyor, comprising:

a first step of forcibly rotating the works loaded on and supported by the carrier or conveyor about the rotational axis extending in the approximately horizontal direction thereof by applying rotational force to the works;

a second step of shifting forcible rotation of the works to free rotation of the works by suspending application of rotational force to the works;

a third step of holding the works so that the free rotation of the works causes the works to rotate and the rotation of the works is then suspended; and a fourth step of discharging the works from the carrier or conveyor;

wherein a center of gravity of a rotary member including the works is located in a position that is below a horizontal plane that contains the rotational axis, prior to rotation of the works.

2. A method as claimed in claim 1, wherein the works is a body of a vehicle.

3. A method as claimed in claim 2, wherein the body of the vehicle is supported by the carrier or conveyor with a roof of the body thereof disposed at the top of the body and a floor of the body thereof disposed at the bottom of the body in such a state that the center of gravity of a rotary member containing the body thereof is disposed below the rotational axis extending in the approximately horizontal direction of the carrier or conveyor so that the center of gravity is positioned underneath the rotational axis in a vertically extending plane containing the rotational axis prior to rotation of the works.

4. A method as claimed in claim 3, wherein the first step is carried out in a drying step in a coating line for coating the bodies of the vehicles.

5. A method as claimed in claim 1, further comprising:

a fifth step of causing the works to pivot about the rotational axis extending in the approximately horizontal direction of the carrier or conveyor at an angle relative to said rotational axis, said fifth step being set to be carried out prior to the first step;

a sixth step of shifting from the pivoting of the works to the free rotation thereof on account of inertia about the rotational axis extending in the approximately horizontal direction of the carrier or conveyor, said sixth step being set to be carried out subsequent to the fifth step; and a seventh step of shifting to the first step when a direction of rotation on account of inertia coincides with a direction of forcible rotation at the first step in the course of rotating the works on account of inertia.

6. A method as claimed in claim 5, wherein the works is a body of a vehicle.

7. A method as claimed in claim 6, wherein the body of the vehicle is supported with a roof of the body thereof disposed at the top of the body and a floor of the body thereof disposed at the bottom of the body by the carrier or conveyor in such a state that the center of gravity of a rotary member containing the body thereof is disposed below the rotational axis extending in the approximately horizontal direction of the carrier or conveyor so that the center of gravity is positioned underneath the rotational axis in a vertically extending plane containing the rotational axis, prior to rotation of the works.

8. A method as claimed in claim 7, wherein the first step is carried out in a drying step in a coating line for coating the bodies of the vehicles.

9. A method for conveying works loaded on and supported by a running carrier or conveyor while rotating the works about a rotational axis extending in an approximately horizontal direction of the carrier or conveyor, comprising:

a first step of forcibly pivoting the works loaded on and supported by the carrier or conveyor at an angle about the rotational axis extending in the approximately horizontal direction thereof;

a second step of rotating the works on account of inertia about the rotational axis extending in the approximately horizontal direction of the carrier or conveyor by shifting forcible rotation of the works to free rotation thereof; and a third step of forcibly rotating the works about the rotational axis extending in the approximately horizontal direction thereof by applying rotational force to the works when the direction of rotation of the works on account of inertia coincides with the direction of the forcible rotation of the work in the course of the rotation of the works on account of inertia;

wherein the center of gravity of a rotary member containing the works is located in a position that is below a horizontal plane that contains the rotational axis, prior to rotation of the works.

10. A system for conveying works loaded on and supported by a carrier or conveyor running over a plurality of stations while rotating the works about a rotational axis extending in an approximately horizontal direction of the carrier or conveyor, comprising:

a rotary member for supporting the works such that a center of gravity of the rotary member containing the works is set so as to be positioned underneath the rotational axis in a vertical plane containing the rotational axis, prior to rotation of the works;

a locking or unlocking mechanism for locking or unlocking a rotational movement of the rotary member containing the works in such a state that the works is loaded on the carrier or conveyor; and means for releasing a driving force which rotates the works so that free rotation of the rotary member occurs before the center of gravity of the rotary member containing the works is positioned in the vertical plane containing the rotational axis;

wherein the releasing means further comprises a lever, rotation movement of which is transformed into the rotation of said rotary member, and a cam plate engageable with said lever after said lever is engaged and rotated at an angle.

11. A system as claimed in claim 10, wherein:

the works is a body of a vehicle;

the unit for conveying the works is disposed in a coating line for coating bodies of vehicles;

the coating line contains at least an entry station for entering the bodies of the vehicles onto carriers or conveyors, a coating station for coating the bodies of the vehicles loaded on and supported by the carriers or conveyors with a paint, a drying station for drying a coat coated on each of the bodies of the vehicles, and a discharging station for discharging the bodies of the vehicles loaded on and supported by the carriers or conveyors; and the drying station has means for driving rotational force of the body of the vehicle to forcibly rotate the body thereof.

12. A system as claimed in claim 11, wherein the body of the vehicle is loaded on and supported by the carrier or conveyor in such a state that a roof of the body is positioned on the top of the body and a floor thereof is positioned on the bottom of the body.

13. A system as claimed in claim 12, wherein:

the entry station has means for operating the locking mechanism for locking rotation of the body of the vehicle; and means interposed between the coating station and the drying station for operating the unlocking mechanism for unlocking the body of the vehicle loaded on and supported by the carrier or conveyor.

14. A system as claimed in claim 13, further comprising:

pivotal means disposed at an upstream end section of the drying station for displacing the body of the vehicle at the angle relative to the rotational axis by pivoting about the rotational axis extending in the approximately horizontal direction of the carrier or conveyor; and means for driving rotational force of the body of the vehicle disposed on a downstream side of the pivotal means for applying the rotational force to the body of the vehicle when the direction of rotation of the body thereof on account of inertia coincides with the direction of the forcible rotation of the body thereof to be carried out by the means for driving the rotational force of the body thereof, in the course in which the body of the vehicle is rotated on account of inertia about the rotational axis after the body thereof is released from the pivotal means.

15. A system as claimed in claim 14, wherein the discharging station has means for aligning the body of the vehicle in such a state that a roof of the body is positioned at the top of the body and a floor of the body is positioned at the bottom of the body.

16. A system for conveying works loaded on and supported by a carrier or conveyor running over a plurality of stations while rotating the works about a rotational axis extending in an approximately horizontal direction of the carrier or conveyor, comprising:

a rotary member for supporting the works such that a center of gravity of the rotary member containing the works is located in a position that is below a horizontal plane that contains the rotational axis, prior to rotation of the works;

means for applying a driving force to the works so that the rotary member containing the works is rotated about the rotational axis;

means for releasing the driving force applied to the works so that the works is not rotated by the driving force; and means for allowing free rotation of the works on account of inertia;

wherein the applying and releasing means further comprises a lever, rotation movement of which is transformed into the rotation of said rotary member, and a cam plate engageable with said lever and disengageable with said lever after said lever is engaged and rotated at an angle.

17. A system as claimed in claim 16, further comprising means for holding the works after the free rotation of the works is suspended.

18. A system for conveying works loaded on and supported by a carrier or conveyor running over a plurality of stations while rotating the works about a rotational axis extending in an approximately horizontal direction of the carrier or conveyor, comprising:

a rotary member for supporting the works such that a center of gravity of the rotary member containing the works is located in a position that is below a horizontal plane that contains the rotational axis, prior to rotation of the works;

means for applying a first driving force to the works so that the works is rotated in a first direction about the rotational axis;

means for releasing the first driving force applied to the works so that the works is not rotated by the first driving force;

means for allowing free rotation of the works on account of inertia so that the works is rotated in a second direction that is opposite to the first direction; and means for applying a second driving force to the works in the course of the free rotation of the works on account of inertia so that the works is rotated in the second direction;

wherein the means for applying the first driving force and the means for releasing the first driving force further comprise a lever, rotation movement of which is transformed into the rotation of said rotary member, and a cam plate engageable with said lever and disengageable with said lever after said lever is engaged and rotated at an angle.

19. A system as claimed in claim 18, wherein the means for applying the second driving force further comprises an endless chain and a sprocket member engageable with said endless chain.

20. An apparatus for rotating and conveying an article on a coating line comprising:

a rail;

a carriage having a frame with front and rear parts and movable along and guided by said rail;

upright columns mounted at the front and rear parts of said frame;

an endless chain for rotating said article, said endless chain being in parallel with a direction of travel of said carriage, and said endless chain being movable at a speed different from that of said carriage;

a cross shaft disposed on said carriage, said cross shaft being arranged at a right angle with respect to the direction of travel of said carriage;

a sprocket disposed on said cross shaft, said sprocket being mounted at one end of said cross shaft and being engageable with said endless chain as the carriage moves along said rail;

rotating shafts supported on said upright columns, said shafts being aligned along an axis parallel to the direction of travel of said carriage;

means for connecting the rotating shaft in driving relationship to said cross shaft;

front and rear support arms disposed on the respective rotating shafts for removably supporting the lower parts of front and rear ends of said article, with its center of gravity positioned lower than said axis;

a lever mounted on the outer end of said cross shaft; and a cam plate mounted along said rail, said cam plate being engageable with said lever as said sprocket approaches the position in which it engages with said endless chain, for rotating said lever through a specific angle, and causing said article to begin rotation before said sprocket engages with said endless chain.

* * * * *